United States Patent
Varadarajan et al.

(10) Patent No.: US 8,743,908 B2
(45) Date of Patent: Jun. 3, 2014

(54) COEXISTENCE OF PRIME, S-FSK AND G3 DEVICES IN POWERLINE COMMUNICATIONS

(75) Inventors: Badri N. Varadarajan, Dallas, TX (US); Anand G. Dabak, Plano, TX (US); Il Han Kim, Dallas, TX (US); Donald P. Shaver, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 337 days.

(21) Appl. No.: 13/079,858

(22) Filed: Apr. 5, 2011

(65) Prior Publication Data

US 2011/0255557 A1 Oct. 20, 2011

Related U.S. Application Data

(60) Provisional application No. 61/345,388, filed on May 17, 2010, provisional application No. 61/325,858, filed on Apr. 20, 2010.

(51) Int. Cl.
*H04J 3/24* (2006.01)

(52) U.S. Cl.
USPC .......................................................... 370/474

(58) Field of Classification Search
None
See application file for complete search history.

(56) References Cited

U.S. PATENT DOCUMENTS

| | | | | |
|---|---|---|---|---|
| 7,558,294 B2* | 7/2009 | Yonge et al. | ................... | 370/509 |
| 7,609,681 B2* | 10/2009 | Kurobe et al. | ................ | 370/347 |
| 8,180,391 B2* | 5/2012 | Fujii et al. | ................... | 455/552.1 |
| 8,498,280 B2* | 7/2013 | Das et al. | ........................ | 370/338 |
| 8,571,118 B2* | 10/2013 | Zyren | ............................ | 375/257 |
| 2007/0025383 A1* | 2/2007 | Katar et al. | .................... | 370/442 |
| 2010/0315939 A1* | 12/2010 | Verbin et al. | ................... | 370/201 |
| 2010/0316140 A1* | 12/2010 | Razazian et al. | .............. | 375/257 |
| 2011/0299514 A1* | 12/2011 | Kwon | ........................... | 370/338 |
| 2012/0044900 A1* | 2/2012 | Morioka et al. | .............. | 370/329 |
| 2012/0135694 A1* | 5/2012 | Meier et al. | ..................... | 455/79 |
| 2012/0243522 A1* | 9/2012 | Morioka et al. | .............. | 370/338 |

OTHER PUBLICATIONS

A. Sanz et al. "PRIME from the definition to a SoC solution", IEEE International Symposium on Power Line Communications and Its Appications. 2009 (ISPLC 2009), Dresden, Mar. 29, 2009-Apr. 1, 2009 (2009. 5. 8. (c)2009 IEEE) See abstract, pp. 347-352.

(Continued)

*Primary Examiner* — Hassan Kizou
*Assistant Examiner* — Amy Ling
(74) *Attorney, Agent, or Firm* — Steven A. Shaw; Wade James Brady, III; Frederick J. Telecky, Jr.

(57) ABSTRACT

Communication devices, such as base nodes and modems, that comply with two or more different standards operate on a shared communication channel. To avoid mutual interference, a base node operating under a first standard reserves time using a contention free period designation. The base node allows devices operating under a second standard to communicate during the reserved time by not assigning the contention free period to another device operating under the first standard. Alternatively, a device using the first standard may avoid interference from transmissions generated under the second standard by modifying data packets prior to transmission. A prefix corresponding to a preamble in the second standard is added to the beginning of the data packet created under the first standard. Devices operating under the second standard observe the prefix and recognize that the channel is active. The second-standard devices backoff from transmission thereby minimizing interference.

19 Claims, 6 Drawing Sheets

(56) References Cited

OTHER PUBLICATIONS

Stefano Galli et al. "The Inter-PHY Protocol (IPP): A Simple Coexistence Protocol for Shared Media", IEEE International Symposium on Power Line Communications and Its Appications, 2009 (ISPLC 2009), Dresden, Mar. 29, 2009-Apr. 1, 2009 (2009. 5. 8. (c)2009 IEEE). See abstract, pp. 194-199.

Akihito Suzuki et al. "Study on the coexistence of two types of PLCs in HF Band", Consumer Electronics, 2009 (ICCE '09), Digest of Technical Papers International Conference, Las Vegas, NV, Jan. 10-14, 2009 (2009. 5. 29. (c) 2009 IEEE); See P-3-8 abstract and part I-part VI.

M.K. Lee et al. "Home Plug 1.0 powerline communication LANs-protocol description and performance results", Published online May 15, 2003, Copyright #2003, John Wiley & Sons, Ltd, See summary, pp. 449-460.

\* cited by examiner

FIG. 1
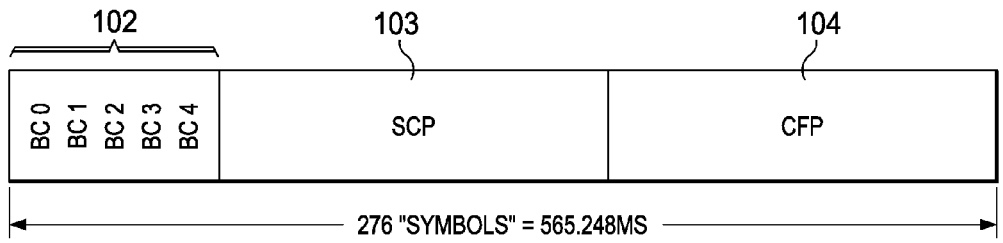
FIG. 2
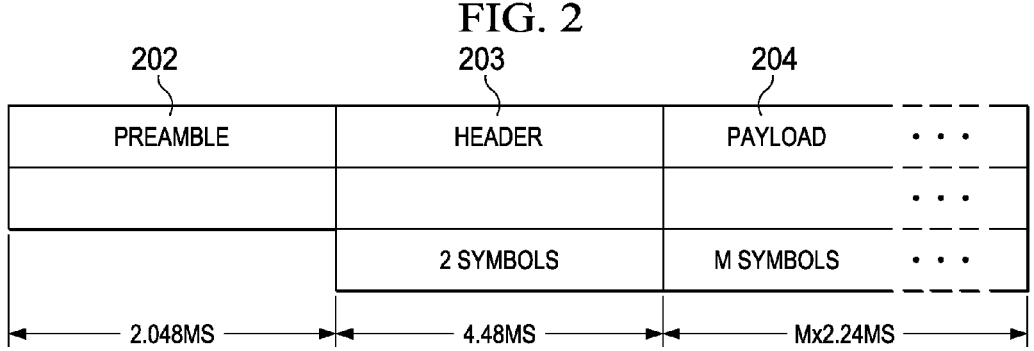
FIG. 3
| BASE BAND CLOCK (HZ) | 250000 | |
|---|---|---|
| SUBCARRIER SPACING (HZ) | 488.28125 | |
| NUMBER OF DATA SUBCARRIERS | 84 (HEADER) | 96 (PAYLOAD) |
| NUMBER OF PILOT SUBCARRIERS | 13 (HEADER) | 1 (PAYLOAD) |
| FFT INTERVAL (SAMPLES) | 512 | |
| FFT INTERVAL (μS) | 2048 | |
| CYCLIC PREFIX (SAMPLES) | 48 | |
| CYCLIC PREFIX (μS) | 192 | |
| SYMBOL INTERVAL SAMPLES | 560 | |
| SYMBOL INTERVAL (μS) | 2240 | |

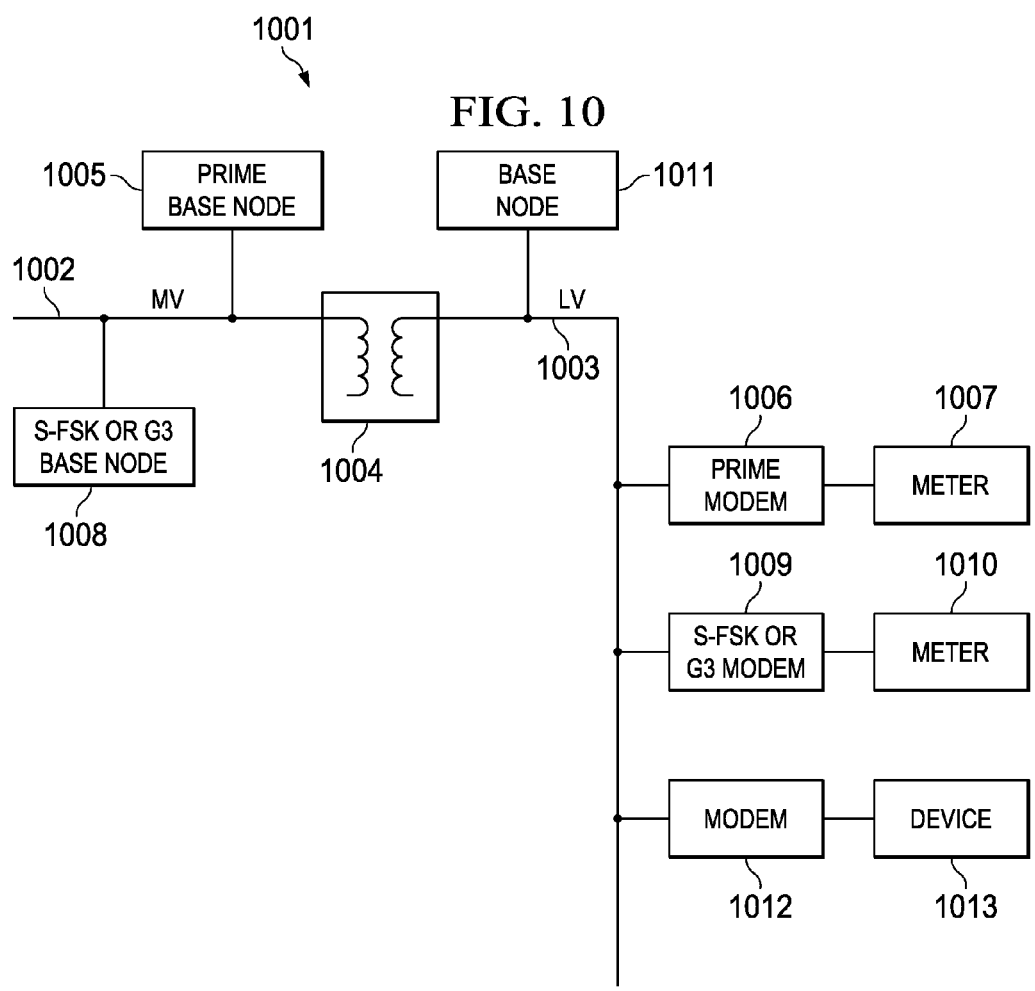

COEXISTENCE OF PRIME, S-FSK AND G3 DEVICES IN POWERLINE COMMUNICATIONS

CROSS-REFERENCE TO RELATED APPLICATIONS

This application claims the benefit of the filing dates of U.S. Provisional Application No. 61/325,858, which is titled "PRIME Coexistence with S-FSK" and was filed Apr. 20, 2010, and U.S. Provisional Application No. 61/345,388, which is titled "PRIME G3 Coexistence" and was filed May 17, 2010, the disclosures of which are hereby incorporated by reference herein in their entireties.

TECHNICAL FIELD

Embodiments are directed, in general, to powerline communication (PLC) devices and, more specifically, to minimizing conflicts caused by transmissions from devices operating under different PLC standards.

BACKGROUND

The PRIME (Powerline Related Intelligent Metering Evolution) standard defines lower layers of a PLC narrowband data transmission system for the electric power grid using Orthogonal Frequency-Division Multiplexing (OFDM) in the 42-90 kHz band.

The International Electrotechnical Commission (IEC) 61334-5-1 standard defines low-speed power line communications in the 60-76 kHz band. IEC 61334-5-1 is also known as S-FSK (Spread Frequency Shift Keying) and was formerly known as IEC 1334. For simplification of the following discussion, the S-FSK/IEC 61334-5-1 Standard is referred to as "S-FSK" in this document.

G3 is an OFDM-based powerline communications standard promoting interoperability in smart grid implementations in the 35-90 kHz band.

The OpenMeter forum, in its Working Package 2, has reviewed existing PLC technologies and identified research areas and gaps in the current state of knowledge. A coexistence gap exists between PRIME and S-FSK that makes interoperability between PRIME and S-FSK challenging.

Powerline communication systems based on narrowband OFDM (NB-OFDM) are gaining popularity in smart grid technologies. European utilities, notably Iberdrola (PRIME) and ERDF (G3) are pioneering the deployment of NB-OFDM PLC systems for advanced metering. The SAE and the ISO have shortlisted NB-OFDM systems that are based on PRIME and G3 for car charger applications. Spurred by these and other possible applications, at least two major standards development organizations—the IEEE and the ITU—are now specifying communication systems based on NB-OFDM.

SUMMARY

The relative popularity of various standards will probably be determined in the marketplace over the next few years. However, it is essential to ensure all of the nascent standards provision coexistence/interoperation methods. The following points are noted:

Interoperability between different standards may be achieved at the network level, since most standards offer methods to converge to IPv4 or IPv6 (or in metering applications, IEC 432). Therefore, at the PHY/MAC level, coexistence is both a more realistic and effective target.

Non-disruptive coexistence at the PHY level is automatically achieved in some cases by frequency separation. The European Cenelec regulations facilitate this by dividing available band into utility-owned, in-home and shared bands.

Coexistence in the Cenelec-C band is mandated by Cenelec regulations, using a band-in-use tone signal, and rules governing the duty cycle of each technology. A variant of this method, involving technology-specific wideband signatures (instead of a generic tone), has been adopted for broadband OFDM PLC systems.

While band-in-use signaling does achieve coexistence, it often involves significant losses in throughput particularly and raise issues about the "fairness" of access rules under different deployment densities for different technologies in a region.

Where possible, it would be preferable for popular standards/alliances to develop fair and effective coexistence mechanisms. Disclosed is a method for the two most popular narrowband OFDM standards—namely PRIME and G3—to coexist. Since PRIME and G3 are a strong basis for incipient standards in the area, embodiments provide a path for seamless coexistence among emerging narrowband PLC technologies.

BRIEF DESCRIPTION OF THE DRAWINGS

Figure 4:
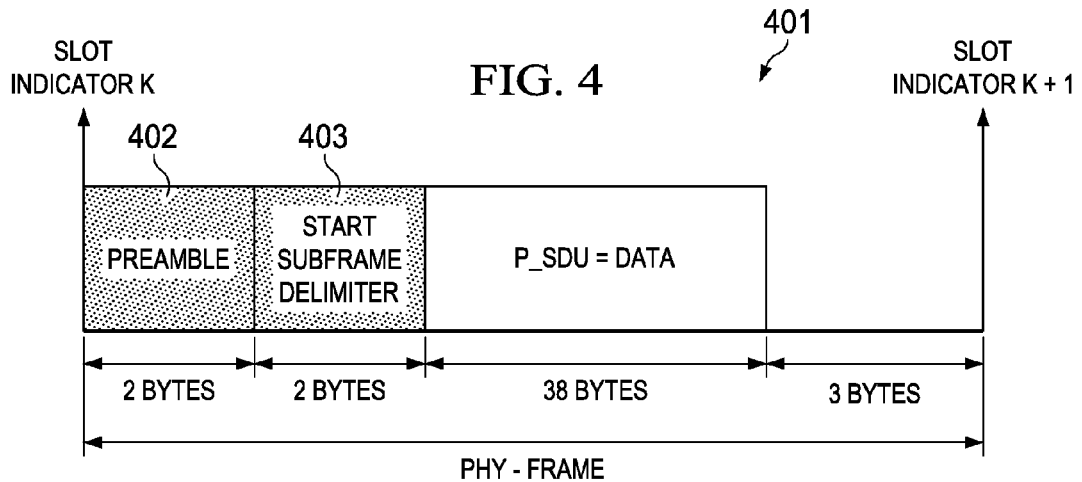
Figure 8:
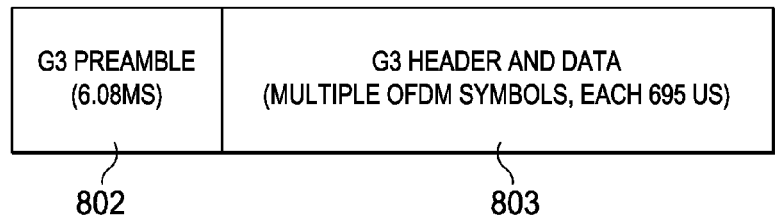
Figure 9:
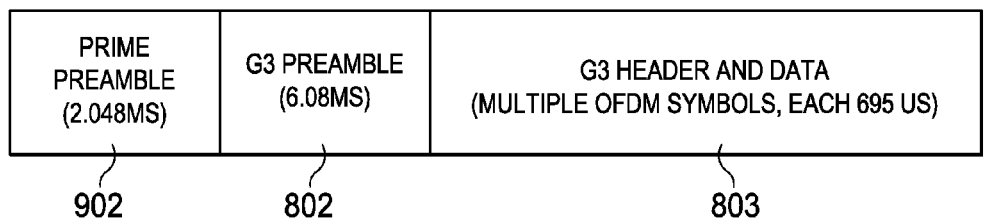
Figure 5:
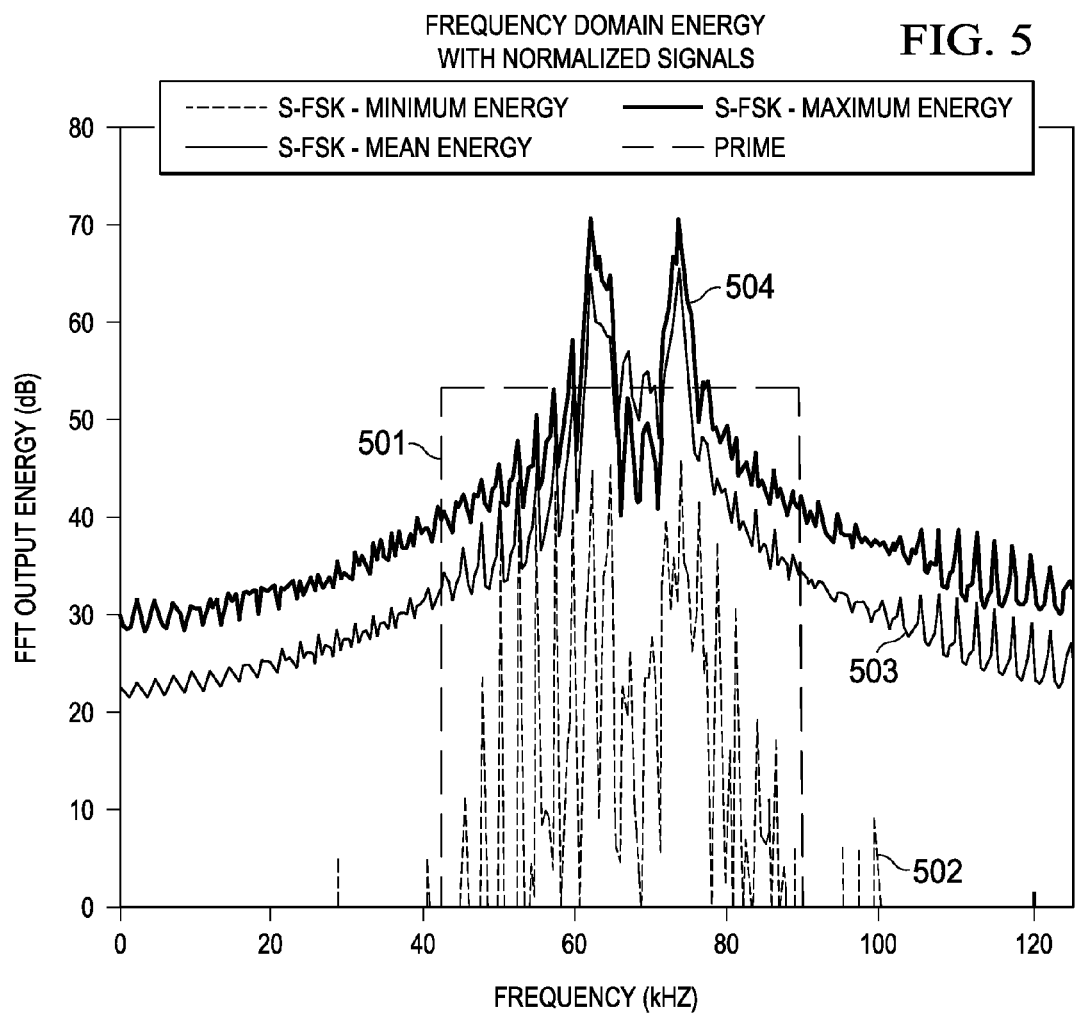
Figure 6:
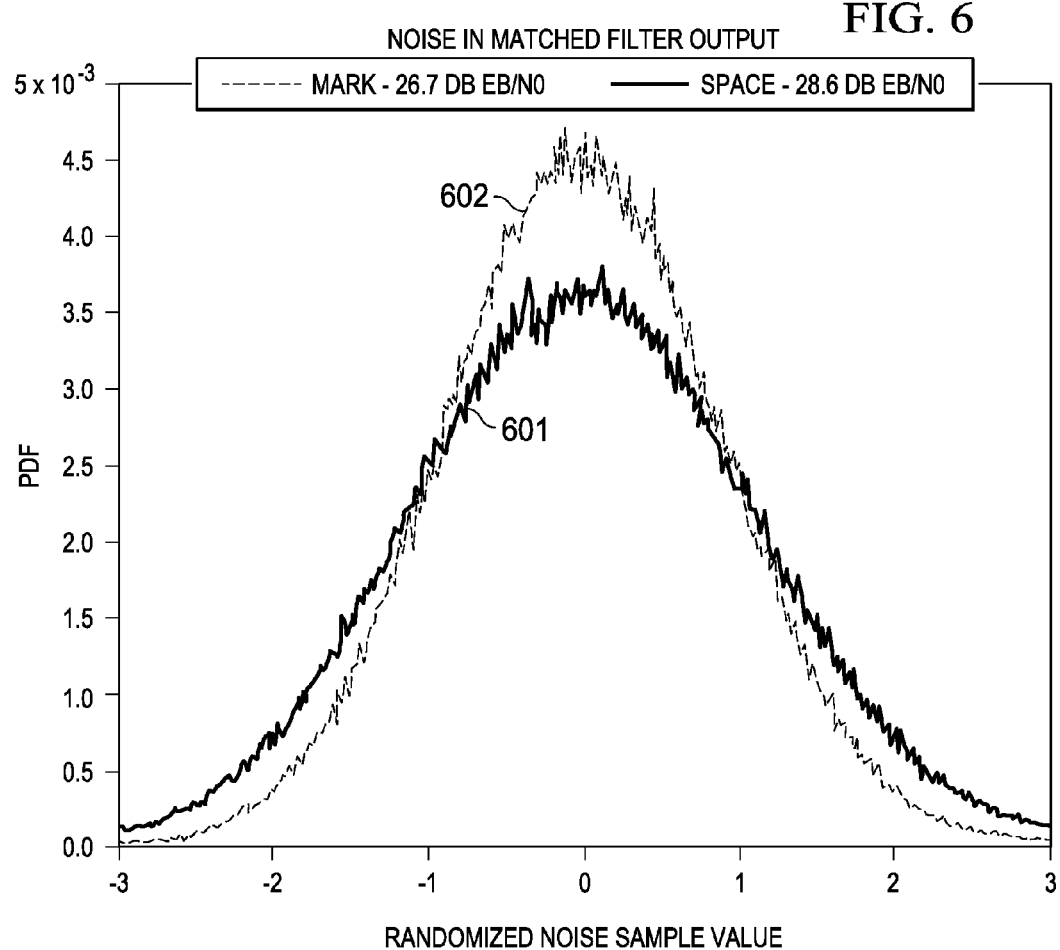
Figure 7:
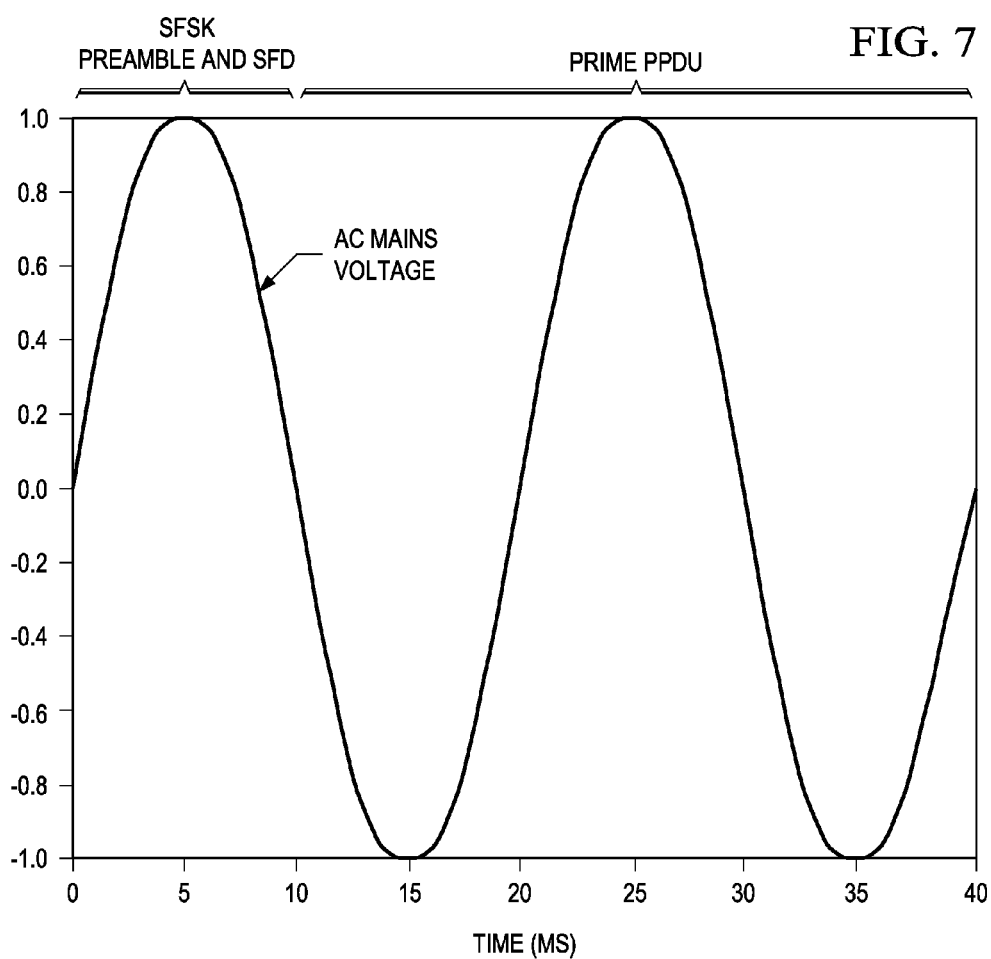

Having thus described the invention in general terms, reference will now be made to the accompanying drawings, wherein:

FIG. 1 illustrates the frame structure used in the PRIME standard;

FIG. 2 illustrates a Physical Protocol Data Unit (PPDU) in the PRIME standard;

FIG. 3 lists parameters for PRIME OFDM symbols;

FIG. 4 illustrates the S-FSK PPDU structure;

FIG. 5 illustrates the FFT output energy for PRIME and various S-FSK transmissions;

FIG. 6 illustrates a matched filter output noise distribution when a PRIME transmission interferes with an S-FSK transmission;

FIG. 7 illustrates a PRIME PPDU with a channel reservation preface sequence added;

FIG. 8 illustrates a G3 PPDU including a preamble and header/data segment;

FIG. 9 illustrates a G3 PPDU structure with the PRIME preamble added as a prefix; and FIG. 10 is a high-level block diagram of a powerline communications (PLC) network.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

PRIME Features

FIG. 1 illustrates the frame structure 101 used in the PRIME standard. PRIME divides times in Media Access Control (MAC) frames. In the current PRIME specification, each frame 101 lasts 565.248 ms. The "base node" transmits beacon symbols 102 at the beginning of each frame. It also allots beacon slots to switch nodes for transmitting their own beacons. Beacon transmission is followed by a Shared Contention Period (SCP) 103 during which all PRIME nodes may contend for access. A frame may also contain an optional Contention Free Period (CFP) 104 that the base node may allot exclusively to individual nodes. Note that the base node may also leave CFP periods 104 empty.

Two other aspects of the PRIME standard are relevant to coexistence with the other PLC standards: (1) how PRIME nodes sense the channel to see if it is busy, and (2) the nature of PRIME transmission once a node has access to the channel. The second aspect is described in connection with FIG. 2, which illustrates a Physical Protocol Data Unit (PPDU) 201 in the PRIME standard. Each PPDU 201 starts with a preamble 202, which is a chirp sequence that sweeps the frequency from 42 kHz to 90 kHz in 2.048 ms. The preamble 202 is followed by the PRIME header 203 and payload 204. Header 203 and payload 204 are both OFDM transmissions that use the PRIME OFDM symbol parameters shown in FIG. 3. The PRIME symbols contain 97 tones differentially modulated in the frequency domain, with a spacing of around 0.5 kHz between tones.

S-FSK Features

The S-FSK standard specifies two carriers in the Cenelec A band. (CENELEC: (French: ComitéEuropéen de Normalisation Électrotechnique) is the European Committee for Electrotechnical Standardization). Each bit is conveyed by transmitting the mark or space carrier, at a baud rate of 300, 600, 1200 or 2400 bps. For the purpose of this discussion, the Linky profile is used, wherein the two carriers are at 63.3 and 74 kHz, with a tolerance of 0.5%; and the baud rate is 2400 bps.

Unlike PRIME networks, S-FSK networks are not synchronized to a periodic beacon. However, the start of each PPDU (known as an S-FSK frame) is synchronized to the zero crossing of the AC mains cycle (20 ms period in Europe). Further, each S-FSK PPDU structure 401, as shown in FIG. 4, is 45 bytes long with a 2-byte preamble 402 and a 2-byte Start Frame Delimiter (SFD) 403. At a baud rate of 2400 bps, the PPDU duration length is 150 ms, and the preamble duration is 6.667 ms.

Coexistence of PRIME and S-FSK without Changes

The following analysis is a study of the possible coexistence of the existing PRIME and S-FSK standards.

Effect of S-FSK Transmissions on PRIME Network

S-FSK transmissions would cause narrowband interference to the PRIME signals. The extent of the interference is illustrated in FIG. 5. Curve 501 shows the Fast Fourier Transform (FFT) output at the receiver, when only a PRIME signal (1 Vrms) is present. As expected, the FFT output is flat in frequency from 42-90 kHz. The other three curves show the minimum (502), mean (503) and maximum (504) FFT output energies from S-FSK signals, also normalized at 1 Vrms. The variation occurs because the FFT output energy depends on the actual bits transmitted by the S-FSK transmitter in a symbol, and their relative phases with respect to the start of the PRIME symbol. The illustrated curves consider all possible values.

When S-FSK and PRIME signals are received with the same energy, there is severe interference to PRIME from about 61 kHz to about 75 kHz. This is obtained by placing a rough threshold of 5 dB for the signal-to-interference ratio in each tone, which is the operating SNR for the lowest coded rate in PRIME. Some tones in the PRIME transmission that occur between the two peaks corresponding to the mark and space frequencies in the S-FSK transmission may not be severely affected. However, with frequency differential encoding, they will need to be discarded as well. Of course, the S-FSK signal strength will be different from the PRIME signal, and correspondingly, different numbers of PRIME tones may be affected by S-FSK. Table 1 lists the number of tones affected for various relative signal strengths. Clearly, if the S-FSK signal is more than 5 dB above the PRIME signal, it would seriously affect PRIME communication.

TABLE 1

| SFSK-PRIME SIGNAL RATIO (dB) | APPROXIMATE NUMBER OF TONES AFFECTED (<5 dB SNR) |
|---|---|
| −20 | 97 (all tones) |
| −10 | 61 |
| −5 | 39 |
| 0 | 23 |
| 10 | 10 |
| 15 | 2 |

Like all OFDM systems, PRIME has some in-built resistance to narrowband interference. Primarily, this is achieved by detecting the narrowband interference and either erasing the tones, or implicitly reducing the "confidence" of the soft information by using per-tone (or per-subband) noise variance estimation. However, it is clear that the loss of tones will affect performance. Based on Table 1 above, it is estimated that PRIME can withstand S-FSK interference that is at most 5 dB above the PRIME transmission.

Effect of PRIME Transmissions on S-FSK Network

Simulations were run to estimate the effective noise energy seen by an S-FSK receiver when a PRIME signal of equal energy is transmitted in the vicinity and interferes with the S-FSK signal. A number of PRIME symbols were generated randomly, normalized for energy, and correlated with the space and mark tone symbols. The resultant noise distribution is plotted in FIG. 6. Interestingly, the mark tone (63 kHz) 601 suffers from 2 dB higher noise than the space tone (602). Also, the noise distribution of the mark tone (601) is not quite Gaussian. Note, however, that this could change if there are part-to-part variations in the mark and space frequencies, or in the PRIME sampling frequency.

Most importantly, the $E_b/N_0$ seen by the S-FSK receiver is around 27 dB for both tones. To estimate the resultant performance, refer to the second column in Table 2, which is extracted from the S-FSK standard. Since S-FSK has no forward error correction, an S-FSK frame is in error if any of the approximately 300 bits is in error. To achieve reliable communication, it is estimated that the target Bit Error Rate (BER) should be less than 0.1%, which will require at least 12 dB $E_b/N_0$ based on a standard non-coherent FSK receiver. This is 5 dB better than the specifications in Table 2. (Note that the $E_b/N_0$ limits in Table 2 should serve as guidelines. They are at least 3 dB above the theoretically achievable results).

TABLE 2

| BER | −5 dB < x < 5 dB | x = ±10 dB | x = ±20 dB |
|---|---|---|---|
| $10^{-5}$ | $E_b/N_0 < 21$ dB | $E_b/N_0 < 17$ dB | $E_b/N_0 < 7$ dB |
| $10^{-4}$ | $E_b/N_0 < 19$ dB | $E_b/N_0 < 15$ dB | $E_b/N_0 < 5$ dB |
| $10^{-3}$ | $E_b/N_0 < 17$ dB | $E_b/N_0 < 13$ dB | $E_b/N_0 < 3$ dB |
| $10^{-2}$ | $E_b/N_0 < 14$ dB | $E_b/N_0 < 11$ dB | $E_b/N_0 < 1$ dB |
| $10^{-1}$ | $E_b/N_0 < 10$ dB | $E_b/N_0 < 7$ dB | $E_b/N_0 < -3$ dB |
| $2 \times 10^{-1}$ | $E_b/N_0 < 8$ dB | $E_b/N_0 < 4$ dB | $E_b/N_0 < -5$ dB |

Note that the above analysis is somewhat optimistic, since it measures the effective noise at the output of a coherent matched filter. Practical receivers may implement non-coherent techniques, in which case their effective $E_b/N_0$ will simply be determined by the average receive signal energy to the average noise energy, which from FIG. 5 seems to be around only 10-15 dB. Even with these optimistic assumptions, an S-FSK network can withstand interference from a a PRIME transmission that is at most 15 dB above the S-FSK transmission.

PRIME Profiles that Facilitate Coexistence with S-FSK

The following discussion considers possible PRIME profiles (i.e. small changes to the PRIME network operation) that would facilitate coexistence with S-FSK signals. Implementation-only techniques (i.e. no changes to the PRIME standard, but changes to certification) and PRIME standard changes.

Implementation-Only Techniques

Implementation enhancements to PRIME modems may enhance coexistence with S-FSK networks as discussed below.

Implementation technique 1—PRIME receiver tolerance to S-FSK: Certification tests may be introduced to ensure that PRIME-compliant receivers operate well in the presence of S-FSK interference. Simulations indicate that good performance should be achievable with around −5 dB Signal-to-Interference Ratio (SIR).

Implementation technique 2—enhanced channel sensing: Collisions with S-FSK transmissions can be avoided if PRIME nodes sense that the channel is busy with S-FSK transmissions. This can be done by adding a sensing mode for energy in the mark and space frequency locations.

Implementation technique 3—base node scheduling: The PRIME base node can use the contention-free period (CFP) that is available in the PRIME frame to set aside collision-free slots for S-FSK transmissions by the other network. In this implementation, the PRIME base node reserves a portion of the PRIME frame as a contention-free period, but the PRIME base node does not allot these reserved slots to any of its associated PRIME transmitters. Potentially, the nodes in the S-FSK network can use these reserved slots. However, note that this implementation might further require some way to signal to the S-FSK nodes to use the reserved slots (and not the other portions reserved in the PRIME beacon slots or in the SCP). Since each S-FSK transmission lasts 150 ms, the reserved CFP should be at least as long. This does result in a reduction in the time available for actual PRIME transmissions and, therefore, reduces PRIME throughput. Techniques to enable this implementation are discussed below:

First, if the base node is a dual-mode device that supports both S-FSK and PRIME, the base node can initiate S-FSK communication during the CFP slots reserved for S-FSK only. The dual-mode base node may also ensure that devices it communicates with in the master-slave mode do the same.

Second, to prevent other devices from starting unreserved transmissions, the base node can transmit occasional S-FSK preambles and SFDs without transmitting valid S-FSK data. These transmissions would take up a total of only 4 bytes (or 13.3 ms) and would represent only a small time-domain impulsive interference to PRIME. While sensing the channel, S-FSK nodes would observe the S-FSK preamble and header data and hence would assume the channel is busy for the next 150 ms.

PRIME Standard Changes

Enhancements to the PRIME Standard may promote coexistence with S-FSK networks as discussed below.

Standard enhancement 1—channel reservation using preface sequence: This technique works by adding a channel reservation preface sequence to all PRIME PPDUs as shown in FIG. 7. With this modification, the PRIME nodes sense the channel for both PRIME and S-FSK transmissions (see Implementation technique 2 above) and transmit only if the channel is free from both. If the channel is indeed free, the PRIME nodes transmit a modified PPDU that always starts at the AC mains zero crossing (just like S-FSK) and is prefaced with the S-FSK preamble and SFD. The PRIME receiver nodes ignore the S-FSK preface, which they would not understand or decode, and treat the transmission as a S-FSK packet. However, S-FSK receiver nodes decode the preface and interpret its presence to mean that there is a valid S-FSK frame being transmitted. When the S-FSK receiver node attempts to decode the expected S-FSK frame, there would be a high probability CRC failure because the data is actually a PRIME PPDU. Even if it cannot decode the data, the S-FSK receiver node would still believe that another S-FSK node is transmitting—due to the presence of the header and SFD—and, therefore, would temporarily withhold its own transmission and would return to channel sensing.

Standard enhancement 2—frequency notching: The PRIME standard may be modified to define a profile wherein the PRIME carriers are divided into subbands, for example, 42-60 kHz, 60-75 kHz, and 75-90 kHz bands. The 60-75 kHz subband overlaps the mark and space carrier in the S-FSK band, as illustrated in FIG. 5. The PRIME data would be communicated on the first and third subbands (i.e. outside the S-FSK band) using the current PRIME header and data structure. A pilot tone would be added for the third subband. Some possible variations on how the middle subband is used include:

Transmit zeros in the middle subband and use windowing to reduce the spill-over from the first and third subbands. This would minimize interference to S-FSK devices Transmit data only if channel sensing does not reveal active S-FSK transmissions in the band. One possible way to do this is to transmit the preamble and header only in the first and third subbands, with the header indicating whether the second subband is in use. This opportunistic technique would enhance throughput. Separate coding may also be done on the third subband. Of course, this technique would not be resistant to an S-FSK transmission beginning in the middle of a PRIME PPDU.

It must be noted that even if no data is transmitted on the notched carriers, some of the other carriers will still be affected by the spill-over from the S-FSK carriers, as shown in FIG. 5. Further analysis may be used to quantify the gains from carrier-notching.

Standard enhancement 3—ROBO Mode: One issue for the coexistence challenge is that PRIME communications are affected by the long frequency-domain tail of the S-FSK transmissions. These appear as a noise floor on all PRIME tones. By adding more robust communication modes to PRIME, reliability can be achieved even in the presence of this tail.

S-FSK Changes to Facilitate Coexistence with PRIME

Because S-FSK already has an installed base, and it is assumed that would be not possible to change these existing/legacy devices significantly. One enhancement that could facilitate coexistence is the use of filters to cut down the long frequency-domain tail of the S-FSK tones. Specifically, if some filtering were incorporated in the S-FSK transmission to cut off emissions beyond the 60-75 kHz band, the impact on PRIME receivers would be mitigated.

Conclusions Regarding the Coexistence of PRIME and S-FSK Devices

With the current status of the PRIME and S-FSK standards, coexistence is possible but somewhat limited. PRIME devices can operate only if interference from S-FSK devices is 5 dB or less above the PRIME signal. S-FSK devices are slightly more immune to PRIME transmissions, but even the S-FSK transmissions can only tolerate PRIME transmission about 10-15 dB above them. Note that both of these severe interferences could occur in practice, given that interferer might be located closer to the receiver than the transmitter.

Implementation improvements, including better scheduling and sensing, mandatory high-performance receivers and the like may improve the situation. In particular, scheduling may help if the PRIME base node can control or influence the transmission times of the S-FSK devices.

Simple modifications to the PRIME standard may help avoid collisions both by time-division (channel reservation sequences) and in frequency-domain (carrier notching).

G3 Features

The G3 specification also uses OFDM in the PHY (physical layer), with a PPDU structure that is similar to the PRIME PPDU (FIG. 2). However, at the PHY level, one difference between the two standards is that G3 uses a longer preamble consisting of 9.5 repetitions of a (scaled) base sequence with a length of 640 microseconds. FIG. 8 illustrates the G3 PPDU 801, which includes preamble 802 and header/data segment 803. The PRIME preamble is 3.2 times longer than the G3 base sequence, but the PRIME preamble is only about one third as long as the overall G3 repeated preamble.

A second difference between PRIME and G3 is that G3 uses beaconless networks. The G3 devices operate in a decentralized network in which routing is per-node based on neighbor discovery. Accordingly, unlike PRIME (see FIG. 1), G3 does not need beacons to be transmitted in every frame.

The relative shortness of the PRIME preamble, and the differences in the frame structures, can be used to achieve coexistence between the PRIME and G3 standards as discussed below.

Coexistence of PRIME and G3

Two techniques are disclosed herein to achieve coexistence between PRIME and G3 networks. The first technique involves adding a PRIME preamble as a prefix to the G3 PPDUs. This would ensure basic coexistence between the two standards. The second technique involves reserving time slots for G3 transmissions in PRIME frames. This would ensure high performance by forcing time-division of the channel between the two standards.

Adding a Prefix to PRIME and/or G3 PPDUs

A coexistence challenge for PRIME and G3, as currently defined, is that PRIME and G3 cannot sense each other's transmissions and backoff accordingly to avoid collisions. This is because each technology uses a different signature sequence (the preamble) to indicate channel occupancy. This can be addressed by one of the following methods:

Add a common "band-in-use" preamble to both the PRIME and G3 PPDUs. The PRIME and G3 devices would both be able to sense this newly defined preamble and would backoff if transmissions are identified on the channel. This modification would require changes to both the PRIME and G3 specifications and to existing specification-compliant devices.

Add the shorter PRIME preamble as a prefix to the G3 preamble. This would yield the PPDU structure 901 shown in FIG. 9 for G3 transmissions. The modified G3 PPDU 901 includes a PRIME preamble prefix 902, and the standard G3 preamble 802 and header/data segment 803. Although the PRIME preamble is defined with a 250 kHz sampling frequency, it would be easy to resample it to 400 kHz so that G3 transmitters would continue to run with a 400 kHz clock. With the change proposed in FIG. 9 (i.e. the PRIME preamble added as a prefix to the G3 PPDU structure), the following behavior can be envisioned in channel contention.

PRIME Device Response to Modified G3 Transmissions with Prefix

PRIME devices, including those already deployed, will sense the PRIME preamble transmitted in the G3 PPDU prefix. The PRIME devices will try to decode the header and will likely fail with a high probability. However, the PRIME devices will treat the channel as busy and will back off so as to not interfere with ongoing G3 transmissions, which appear as undecoded PRIME transmissions to the PRIME device.

In addition, an advanced PRIME device may further decode the G3 preamble and header, if the device is capable of such an operation. The advanced PRIME device would then determine exactly how long the channel is busy due to G3 transmissions.

G3 Device Response to PRIME Transmissions

G3 devices will receive the PRIME preamble and will try to detect the G3 preamble, which attempt will fail. In one embodiment, the G3 devices should assume that the channel is busy for the longest PRIME header duration. In an alternative embodiment, the G3 preamble may be added to the PRIME PPDU. The G3 receivers would simply scan for the G3 preamble (no change from current G3), after which they will pass valid headers only for G3 PPDUs and will backoff for PRIME PPDUs.

In addition, some advanced G3 devices may decode the PRIME header, and determine exactly how long the channel is busy due to PRIME transmissions.

Time Reservation for G3 Transmissions in PRIME PPDUs

Preamble prefixing ensures basic coexistence between PRIME and G3 by allowing the PRIME and G3 devices to sense each other's transmissions and hence avoid collisions. However, the performance can be further enhanced with more coordination between the two standards and standard-compliant networks. One way to do this is to exploit the PRIME frame structure.

It is assumed that the PRIME base node can sense the presence of G3 devices in the electrical vicinity. This is not unrealistic since the base node is functionally a concentrator that must read meters using all the powerline communication standards in the vicinity. For example, different utilities may not run independent concentrators in the same geographical area. When a PRIME base node knows that G3 devices exist in the vicinity, the PRIME base node can use the contention-free period (CFP) in the PRIME frame to provide collision-free slots for G3 transmissions. To achieve this, the concentrator declares a portion of the frame to be contention free, but does not give the available slot to any of the PRIME nodes. Instead, this slot is left available for transmissions from G3 nodes. During the PRIME shared contention period, both PRIME and G3 nodes will contend for access. This same technique can be further in the following ways.

If the PRIME base node also has a method of broadcasting the available CFP to G3 nodes, then the G3 nodes can use this knowledge and will not contend with PRIME nodes during the PRIME shared contention period.

Alternatively, the PRIME base node can send a jamming PPDU having a very small PRIME payload and not addressed to any existing PRIME node. If this jamming PPDU is sent just before the start of the shared contention period and the beacon period, the G3 nodes receiving the preamble will try but fail to decode the G3 header. The G3 nodes will then backoff for a relatively long time—potentially for the duration of a longest possible G3 packet. With this technique, the networks may achieve nearly perfect time-division between PRIME and G3 transmissions without necessarily modifying the devices to achieve interoperability.

Conclusions Regarding the Coexistence of PRIME and G3 Devices

PRIME and G3 are two of the most prominent narrowband OFDM standards for powerline communication in the Cenelec-A band. Basic coexistence may be achieved simply by adding the 2.048 ms PRIME preamble as a prefix to G3 PPDUs. This would create a minimal increase in G3 overhead but should not affect G3 performance. PRIME base nodes may improve coexistence by creating contention free periods in the PRIME frame, but refrain from allotting these slots to any PRIME node. This creates slots in which the G3 nodes can transmit without danger of interference from PRIME. This relationship can be further enhanced if the PRIME base node can construct a valid G3 packet to convey information regarding the contention free assignment to the G3 nodes. The only change required for this capability would be to add a different control packet to G3, without changing the PHY.

Example System

FIG. 10 is a high-level block diagram of a powerline communications (PLC) network 1001 using medium voltage (MV) lines 1002 and low voltage lines (LV) 1003, which are coupled using transformer 1004. In the illustrated example, a number of devices, such as base nodes and modems, use PLC network 1001 to communicate. These devices use different standards, such as the PRIME, S-FSK or G3 standards to communicate. A single MV line 1002 or LV line 1003 may carry signals from different standards. As discussed above, the presence of multiple technologies or standards using the same lines may result in interference and degraded performance in the devices using one or more of the technologies or standards.

In PLC network 1001, base node 1005 operates under the PRIME standard. PRIME base node 1005 communicates with PRIME modem 1006 to exchange data with meter 1007, for example, for MV/LV lines 1002/1003. Base node 1008 operates under a different (i.e. non-PRIME) standard, such as S-FSK or G3, also on PLC network 1001 using MV/LV lines 1002/1003. S-FSK or G3 base node 1008 communicates with a corresponding S-FSK or G3 modem 1009 to exchange data with a device, such as meter 1010. It will be understood that base node 1008 and modem 1009 may use either the S-FSK or G3 standard (or even both standards), but are shown in the same device in FIG. 10 merely to simplify the illustration. Furthermore, any number of additional modems 1012 may also be coupled to LV line 1003. Modems 1012 may comply with the PRIME, S-FSK, or G3 standard to communicate with the base nodes and to facilitate the exchange of data with device 1013.

Although shown as coupled to the MV line 1002, base node 1005 and/or base node 1008 may alternatively be coupled to LV line 1003 as illustrated by base node 1011. Base nodes 1005, 1008, 1011 may be, for example, a concentrator or other device that acts as the master of the network or communication technology. Additionally, it will be understood that devices 1007, 1010, 1013 are not limited to utility meters, but may include any device that would benefit or need to exchange data with the base node, including, for example, a home area network, access point, base station, picocell/femtocell, electric vehicle charging station, or the like.

As discussed above, simultaneous transmissions by PRIME base node 1005 and S-FSK/G3 base node 1008, without further coordination or modification, is likely to cause mutual interference and system degradation. The modifications and adaptations disclosed herein would allow two (or more) PCL technologies to coexist on network 1001. This would allow utility providers to upgrade or convert their networks from one technology to another. Additionally, it would allow the use of different technologies on MV/LV lines that are shared between different utility providers or in a deregulated utility environment.

In one embodiment, the PRIME base node 1005 detects the presence of S-FSK devices on network 1001 and maintains a signal-to-interference ration (SIR) of at least 5 dB. Alternatively, PRIME base node 1005 may detect when the channel is busy with S-FSK transmissions, and then backoff until the channel is clear transmitting. The PRIME base node 1005 may identify S-FSK transmissions by monitoring the mark and space frequency locations for S-FSK. In another embodiment, PRIME base node 1005 may schedule transmissions by designating a portion of the PRIME frame as a contention-free period (CFP). Instead of assigning this CFP to modem 1006 or some other PRIME device, but allows the S-FSK/G3 base node 1008 or S-FSK/G3 modem 1009 to transmit during this period.

In further embodiments, the PRIME base node 1008 may add an S-FSK channel reservation sequence, such as a preamble and SFD, to the beginning of the PRIME PPDU. S-FSK base node 1008 and S-FSK modem 1009 would detect this sequence and would backoff because they assume that another S-FSK device is transmitting.

Frequency notching may also be used by PRIME base node 1005 and modem 1006. By transmitting only in subbands that are above and below the expected S-FSK band, no data should be subject to interference from simultaneous S-FSK transmissions. Because of the long frequency-domain tail of S-FSK transmissions, PRIME base node 1005 and modem 1006 may use a more robust encoding for its transmissions to compensate for the "noise" created by the S-FSK signal tail.

PRIME devices 1005, 1006 and G3 devices 1008, 1009 may avoid mutual interference by using a common "band-in-use" preamble on their respective PPDUs. The other device will detect the preamble and will backoff. Alternatively, G3 devices 1008, 1009 may add a PRIME preamble as a prefix to the G3 PPDUs. As a result, PRIME devices 1005, 1006 would sense the PRIME preamble and would recognize the channel as busy, thereby allowing the G3 devices to transmit.

In another embodiment, the PRIME base node 1005 may transmit a jamming PPDU that is not addressed to PRIME modem 1006 or any other active PRIME device. The jamming PPDU may have the minimum payload. G3 devices 1008, 1009 detect the PPDU and cannot decode it. As a result, the G3 devices will backoff to allow what the interpret as another G3 transmission to continue. During this backoff period, the PRIME devices can transmit without interference.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method for reducing interference on a shared alternating current AC power-line communication medium, comprising:

generating, in a modem operating under a first standard, a data frame according to the first standard;

adding a band-in-use preamble according to a second standard to the start of the data frame to create a modified data frame; and transmitting, using the modem operating under the first standard, the modified data frame on the power-line communication medium.

2. The method of claim 1, further comprising:

receiving the modified data frame at a modem operating under the second standard;

decoding the second standard a band-in-use preamble within the modified data frame; and delaying transmissions by the modem operating under the second standard while attempting to decode the modified data frame.

3. The method of claim 1, wherein the first standard is a Powerline-Related Intelligent Metering Evolution (PRIME) standard, and wherein the second standard is an S-FSK (IEC 61334-5-1) standard.

4. The method of claim 2, wherein the data frame is a PHY layer Protocol Data Unit (PPDU) according to the PRIME standard, and further comprising adding a start frame delimiter (SFD) according to the S-FSK standard.

5. The method of claim 1, wherein the first standard is a G3 standard, and wherein the second standard is a Powerline-Related Intelligent Metering Evolution (PRIME) standard.

6. The method of claim 5, wherein the data frame is a PHY layer Protocol Data Unit (PPDU) according to the G3 standard, and wherein the band-in-use preamble is a preamble for a PRIME PPDU.

7. A method for reducing interference on a shared alternating current AC power-line communication medium, comprising:

generating, in a base node operating under a first standard, a data frame designating a contention-free period according to the first standard;

withholding assignment of the contention free period from all nodes operating on the power-line communication medium with the base node under the first standard;

allowing devices operating under a second standard to transmit during the contention-free period; and transmitting data on the power-line communication medium, by the base node operating under the first standard, at the end of the contention-free period.

8. The method of claim 7, wherein the first standard is a Powerline-Related Intelligent Metering Evolution (PRIME) standard, and wherein the second standard is an S-FSK (IEC 61334-5-1) standard.

9. The method of claim 7, wherein the first standard is a Powerline-Related Intelligent Metering Evolution (PRIME) standard, and wherein the second standard is a G3 standard.

10. The method of claim 9, further comprising:

prior to the end of the contention-free period, transmitting a PHY layer Protocol Data Unit (PPDU) on the power-line communication medium, by the base node operating under the first standard, wherein the PPDU is not addressed to an existing node operating under the first standard.

11. The method of claim 10, wherein the PPDU causes devices operating under the second standard to withhold transmissions after the contention-free period during a contention back-off period.

12. A system for communicating on a channel shared by devices operating under multiple standards, comprising:

a base node operating under a first Powerline-Related Intelligent Metering Evolution (PRIME)standard; and a plurality of modems operating under the first Powerline-Related Intelligent Metering Evolution (PRIME) standard;

wherein the base node operates to generate a data frame complying with the first Powerline-Related Intelligent Metering Evolution (PRIME) standard, the data frame further comprising a band-in-use preamble according to an S-FSK (IEC 61334-5-1) standard at the start of the data frame.

13. The system of claim 12, wherein the data frame is a PHY layer Protocol Data Unit (PPDU) according to the PRIME standard, and further comprising adding a start frame delimiter (SFD) according to the S-FSK standard.

14. A system for communicating on a channel shared by devices operating under multiple standards, comprising:

a base node operating under a G3 standard: and a plurality of modems operating under the G3 standard;

wherein the base node operates to generate a data frame complying with the G3 standard, the data frame further comprising a band-in-use preamble according to a Powerline-Related Intelligent Metering Evolution (PRIME) standard at the start of the data frame.

15. The method of claim 14, wherein the data frame is a PHY layer Protocol Data Unit (PPDU) according to the G3 standard, and wherein the a band-in-use preamble is a preamble for a PRIME PPDU.

16. A system for communicating on an alternating current AC power line channel shared by devices operating under multiple standards, comprising:

a base node operating under a first communication standard; and a plurality of modems operating under the first communications standard;

wherein the base node operates to generate and transmit a data frame that designates a contention-free period for the shared channel according to the first communication standard, and wherein the base node withholding assignment of the contention free period from the plurality of modems to allow devices operating under a second communication standard to transmit on the shared channel during the contention-free period, starting at an alternating current AC Mains zero crossing.

17. The system of claim 16, wherein the base node operates to transmit data to the plurality of modems at the end of the contention-free period.

18. The system of claim 16, wherein the communication first standard is a Powerline-Related Intelligent Metering Evolution (PRIME) standard, and wherein the second communication standard is an S-FSK (IEC 61334-5-1) standard.

19. The system of claim 16, wherein the first communication standard is a Powerline-Related Intelligent Metering Evolution (PRIME) standard, and wherein the second communication standard is a G3 standard; and wherein, prior to the end of the contention-free period, the base node operates to transmit a PHY layer Protocol Data Unit (PPDU) on the shared channel, the PPDU not addressed to any of the plurality of modems.

* * * * *